US012749025B2

(12) United States Patent
Bansal et al.

(10) Patent No.: US 12,749,025 B2
(45) Date of Patent: Sep. 29, 2026

(54) LOCAL EXPLANATION OF BLACK BOX MODEL BASED ON CONSTRAINED PERTURBATION AND ENSEMBLE-BASED SURROGATE MODEL

(71) Applicant: Tata Consultancy Services Limited, Mumbai (IN)

(72) Inventors: Krishna Kumar Bansal, New Delhi (IN); Anirudh Thenguvila Purushothaman, Kochi (IN); Bivek Benoy Paul, Kochi (IN); Ramesh Balaji, Chennai (IN); Srinivasa Raghavan Venkatachari, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 504 days.

(21) Appl. No.: 18/471,014

(22) Filed: Sep. 20, 2023

(65) Prior Publication Data

US 2024/0296389 A1 Sep. 5, 2024

(30) Foreign Application Priority Data

Mar. 2, 2023 (IN) ............................ 202321014240

(51) Int. Cl.
*G06N 20/20* (2019.01)

(52) U.S. Cl.
CPC .................................... *G06N 20/20* (2019.01)

(58) Field of Classification Search
CPC ........... G06N 20/20; G06N 5/01; G06N 5/045
See application file for complete search history.

(56) References Cited

U.S. PATENT DOCUMENTS

| | | | | |
|---|---|---|---|---|
| 2021/0049503 A1* | 2/2021 | Nourian | G06F 11/3466 707/737 |
| 2021/0081790 A1 | 3/2021 | Krishnan et al. | |
| 2021/0357776 A1* | 11/2021 | Quader | G06N 20/20 707/737 |
| 2022/0129791 A1 | 4/2022 | Nia et al. | |
| 2022/0198277 A1* | 6/2022 | Nia | G06N 3/0475 707/737 |

(Continued)

FOREIGN PATENT DOCUMENTS

CA 3133729 A1 4/2022

*Primary Examiner* — Yuk Ting Choi
(74) *Attorney, Agent, or Firm* — Finnegan, Henderson, Farabow, Garrett & Dunner, LLP

(57) ABSTRACT

Perturbed data generation for explainable Artificial Intelligence (AI) is still an evolving field and attempts are made towards to addressing the technical challenge of correlation of features that degrades generated explanations for block box models in Machine Learning (ML) or AI domain. A method and system for local explanation of black box model based on constrained perturbation and ensemble-based surrogate model is disclosed. The method disclosed averts data correlation problem by performing data perturbation around the local instance in accordance with distribution of test data set and primarily ensures the values of input features associated with the local instance stay within the feature space and does not form out of distribution scenarios (add adversary cheating). The method autogenerates labels for the perturbed data to fit or train an ensemble based surrogate model that eliminates data bias and improves accuracy of generated explanations.

6 Claims, 15 Drawing Sheets

(56) References Cited

U.S. PATENT DOCUMENTS

| | | | | | |
|---|---|---|---|---|---|
| 2022/0309360 | A1* | 9/2022 | Zohrevand | G06N 20/00 | 707/737 |
| 2023/0025731 | A1* | 1/2023 | Vinov | G06N 5/045 | 707/737 |

* cited by examiner

Molnar diagram (prior art reference)

Perturbed data points generated by the method 200

Explanation as provided by method 200
Bank loan dataset- classification problem

Explanation as provided by SHAP
Bank loan dataset- classification problem

Explanation as provided by method 200
Titanic dataset- classification problem

Explanation as provided by SHAP
Titanic dataset- classification problem

Explanation as provided by method 200
Boston dataset- Regression problem

Perturbation data points visualization – Bank loan dataset

Dot: test data

Plus: Perturbed data

Star: Local instance from test data

Perturbation data points visualization – Titanic dataset

Dot: test data

Plus: Perturbed data

Star: Local instance from test data

Perturbation data points visualization – Boston dataset

LOCAL EXPLANATION OF BLACK BOX MODEL BASED ON CONSTRAINED PERTURBATION AND ENSEMBLE-BASED SURROGATE MODEL

PRIORITY CLAIM

This U.S. patent application claims priority under 35 U.S.C. § 119 to: India application Ser. No. 202321014240, filed on Mar. 2, 2023. The entire contents of the aforementioned application are incorporated herein by reference.

TECHNICAL FIELD

The embodiments herein generally relate to the field of explainable Artificial Intelligence and, more particularly, to a method and system for local explanation of black box model based on constrained perturbation and ensemble-based surrogate model.

BACKGROUND

Machine Learning (ML) or Artificial Intelligence (AI) models mode are black box models. Understanding how these models derive their conclusions is critical. Addressing this problem is the essence of 'explainability' and getting it right is becoming essential. This becomes very critical in use cases like Employee recruitment, Bank Loan etc. Conventional approaches like SHapley Additive explanations (SHAP) and Local Interpretable Model-agnostic Explanations (LIME) are used for generating the explanation on why a model takes a decision. SHAP generates both global and local explanation of model. LIME can give only local explanation of the model. Since LIME and SHAP works on basis of data perturbation for generating local explanations, there is a potential chance that data perturbation could result in Correlation of features and can badly affect the interpretability methods. Correlation causes extrapolation, and extrapolation ruins the interpretability and, in some cases, due to data perturbation some adversarial classifiers can easily fool popular explanation techniques into generating objective explanations which do not reflect the underlying biases.

Efforts are focused into exploring data perturbation approaches to generate the perturbed samples as close possible to predicted target instance/local instance of the black box model, effectively enhancing interpretability with unbiased explanations. One of the existing solution tries to generate perturbed data around the target instance/local instance. However, perturbed data generation for explainable AI is still an evolving domain of AI and better solutions are expected to reduce or eliminate the technical challenge of correlation of features that degrades generated explanations.

SUMMARY

Embodiments of the present disclosure present technological improvements as solutions to one or more of the above-mentioned technical problems recognized by the inventors in conventional systems.

For example, in one embodiment, a method for local explanation of black box model is provided. The method includes selecting a local instance predicted by a black box model for which local explanation is to be generated, wherein the local instance is predicted based on a plurality of input features present in form of a tabular data comprising a plurality of continuous features and a plurality of categorical features. Further, the method includes generating a plurality of sets of perturbed datapoints around the local instance by varying values of the plurality of continuous features and the plurality of categorical features associated with the local instance. The variation of the values for each of the plurality of continuous features is constrained by a Coefficient of Variation (CV) score, obtained from distribution of a percentage of sample data selected from among a test dataset. The variation for each of the plurality of categorical features is generated by randomly selecting a value from the values from a categorical column that covers more than a predefined percentage of the percentage of the sample data selected from among the test dataset;

Further, the method includes labelling each set among the plurality of sets of perturbed datapoints using the black box model to generate a labeled perturbed dataset, wherein the label is a class of the local instance for classification tasks and the label is a continuous value of the local instance for regression tasks. Furthermore, the method includes fitting an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance. Further, the method includes generating local explanations for the local instance predicted by the black box model by identifying contributing features from among the plurality of input features based on features importance identified by the ensemble based surrogate model.

In another aspect, a system for local explanation of black box model is provided. The system comprises a memory storing instructions; one or more Input/Output (I/O) interfaces; and one or more hardware processors coupled to the memory via the one or more I/O interfaces, wherein the one or more hardware processors are configured by the instructions to select a local instance predicted by a black box model for which local explanation is to be generated, wherein the local instance is predicted based on a plurality of input features present in form of a tabular data comprising a plurality of continuous features and a plurality of categorical features. Further, the one or more hardware processors are configured to generate a plurality of sets of perturbed datapoints around the local instance by varying values of the plurality of continuous features and the plurality of categorical features associated with the local instance. The variation of the values for each of the plurality of continuous features is constrained by a Coefficient of Variation (CV) score, obtained from distribution of a percentage of sample data selected from among a test dataset. The variation for each of the plurality of categorical features is generated by randomly selecting a value from the values from a categorical column that covers more than a predefined percentage of the percentage of the sample data selected from among the test dataset;

Further, the one or more hardware processors are configured to label each set among the plurality of sets of perturbed datapoints using the black box model to generate a labeled perturbed dataset, wherein the label is a class of the local instance for classification tasks and the label is a continuous value of the local instance for regression tasks. Furthermore, the one or more hardware processors are configured to fit an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance. Further, the one or more hardware processors are configured to generate local explanations for the local instance predicted by the black box model by identifying contributing features from among the plurality of input features based on features importance identified by the ensemble based surrogate model.

In yet another aspect, there are provided one or more non-transitory machine-readable information storage mediums comprising one or more instructions, which when executed by one or more hardware processors causes a method for local explanation of black box model. The method includes selecting a local instance predicted by a black box model for which local explanation is to be generated, wherein the local instance is predicted based on a plurality of input features present in form of a tabular data comprising a plurality of continuous features and a plurality of categorical features. Further, the method includes generating a plurality of sets of perturbed datapoints around the local instance by varying values of the plurality of continuous features and the plurality of categorical features associated with the local instance. The variation of the values for each of the plurality of continuous features is constrained by a Coefficient of Variation (CV) score, obtained from distribution of a percentage of sample data selected from among a test dataset. The variation for each of the plurality of categorical features is generated by randomly selecting a value from the values from a categorical column that covers more than a predefined percentage of the percentage of the sample data selected from among the test dataset;

Further, the method includes labelling each set among the plurality of sets of perturbed datapoints using the black box model to generate a labeled perturbed dataset, wherein the label is a class of the local instance for classification tasks and the label is a continuous value of the local instance for regression tasks. Furthermore, the method includes fitting an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance. Further, the method includes generating local explanations for the local instance predicted by the black box model by identifying contributing features from among the plurality of input features based on features importance identified by the ensemble based surrogate model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
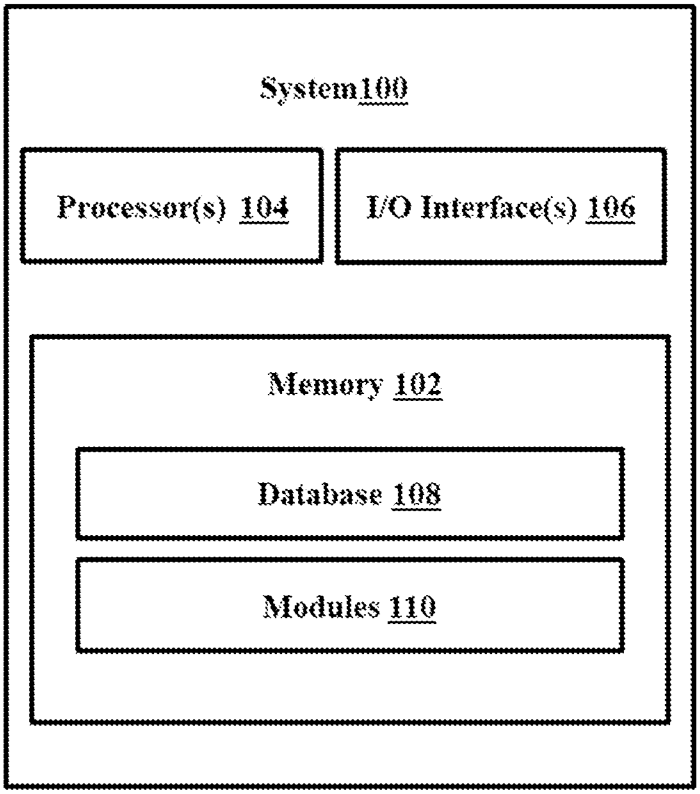
FIG. 1A is a functional block diagram of a system, for local explanation of a black box model based on constrained perturbation and an ensemble-based surrogate model, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

It can be understood that generation of appropriate perturbed data is critical since a surrogate model generates local explanation for a local instance or target instance predicted by a black box model on basis of the perturbed data. Thus, quality of perturbed data effectively reflects quality of generated explanations. To explain the local instance or the target instance the perturbed data should ideally be in same feature space as of the input features to the black box model. Perturbed data generation for explainable Artificial Intelligence (AI) is still an evolving field and attempts are made towards to addressing the technical challenge of correlation of features that degrades generated explanations for block box models in Machine Learning (ML) or AI domain.

Key limitations of existing systems is that the perturbation that they create is not guaranteeing to restrict the generated perturbed data within the base data distribution. This implies that the explanation cannot be reliable as base model might have not seen data which is out of distribution (OOD), and the OOD data will potentially lead to adversarial attacks.

Furthermore, the surrogate models used by existing approaches are linear models, while the real data is inherently non-linear. Thus, explanations generated by such linear surrogate models will fall short of being true explanations.

Embodiments of the present disclosure provide a method and system for local explanation of black box model based on constrained perturbation and ensemble-based surrogate model. The method disclosed averts data correlation problem in the state of the art approaches by performing data perturbation around the local instance in accordance with distribution of test data set. This approach primarily ensures the values of input features, both the continuous features and the categorical features, associated with the local instance stay within the feature space and do not form out of distribution (OOD) scenarios. This constraint features space of perturbed data thereby ensures that even the adversarial classifier cannot cheat the explanation technique. Unlike the prior arts that rely on labeled training dataset for generating perturbed data, the method synthetically generates labeled perturbed data from test dataset (test data is 20%). Thus, a customer does not have to reveal 80% of data (training data) since 20% is enough to derive the distribution required for constraint generation. Further, the method weighs each of the labeled perturbed data based on Inverse of Euclidian distance while fitting the surrogate model on labeled perturb data to generate local explanation. The weights reduce the learning of surrogate model from perturb data that is far away from instance. Furthermore, unlike the existing approaches that use linear surrogate models the method uses the ensemble-based surrogate that can fit on linear and non-linear dataset, which is flexible (less biased) and less data sensitive (less variance), effectively generated relevant local. Practical or real time datasets are mostly non-linear, and it is not recommended to model a non-liner dataset with a linear model, which is mostly the approach used by existing approached, unlike the method disclosed.

Referring now to the drawings, and more particularly to FIGS. 1A through 8C, where similar reference characters denote corresponding features consistently throughout the figures, there are shown preferred embodiments and these embodiments are described in the context of the following exemplary system and/or method.

FIG. 1A is a functional block diagram of a system 100, for local explanation of the black box model based on constrained perturbation and an ensemble-based surrogate model, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
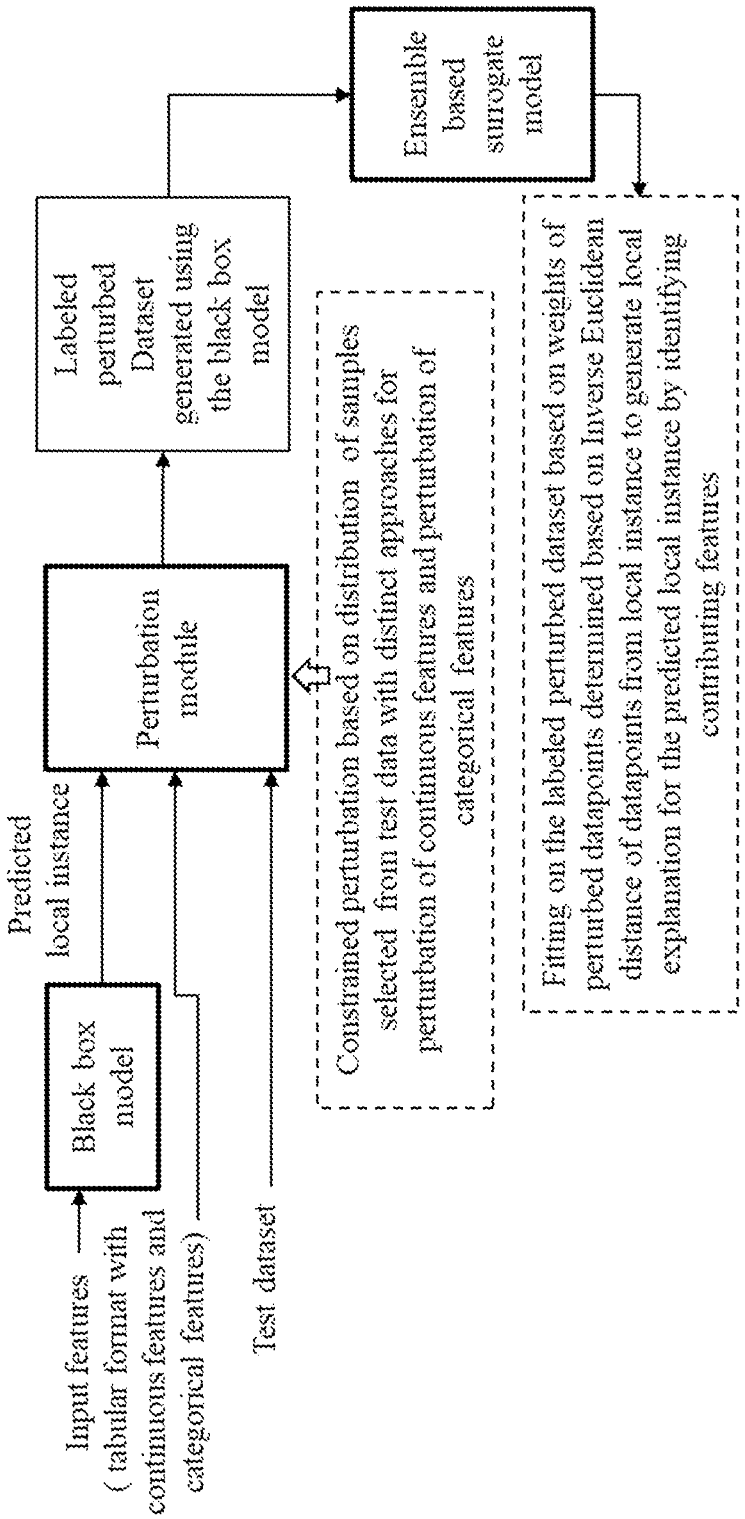
FIG. 1B illustrates an architectural overview of the system of FIG. 1A, in accordance with some embodiments of the present disclosure.

In an embodiment, the memory 102 includes a plurality of modules 110 as depicted in the architectural overview of system 100 in FIG. 1B. The modules 110 includes the black box model for intended predictions for inputs received. The black box model is pretrained AI/ML model, also referred to as pretrained base model. For example, the base model can be Random Forest, XGBoost, Support Vector Machine (SVM) etc. The inputs refers to plurality of features extracted for the input task to be solved, for example predicting approval for bank loan application, predicting candidate selections and so on. The input features herein fall into tabular form comprising a plurality of continuous value features (for example, income, age of people) and a plurality of categorical features (for example, gender, major-minor, dependents and the like). Further the modules include perturbation module to generate the perturbed data and the ensemble based surrogate model generate explanations.

Further, the plurality of modules 110 include programs or coded instructions that supplement applications or functions performed by the system 100 for executing different steps involved in the process of generating local explanations for predictions made by the black box model, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted piece of code for refinement and data that is processed, received, or generated as a result of the execution of the plurality of modules in the module(s) 110. The database can store the test dataset. The perturbation module learns the distribution of the test data and accordingly automatically defines constraints during perturbed data generation). The database 108 further stores the perturbed dataset and can also store the output of the system 100, i.e., the generated local explanations by the ensemble based surrogate model.

Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 through FIG. 8C.

Figure 2A:
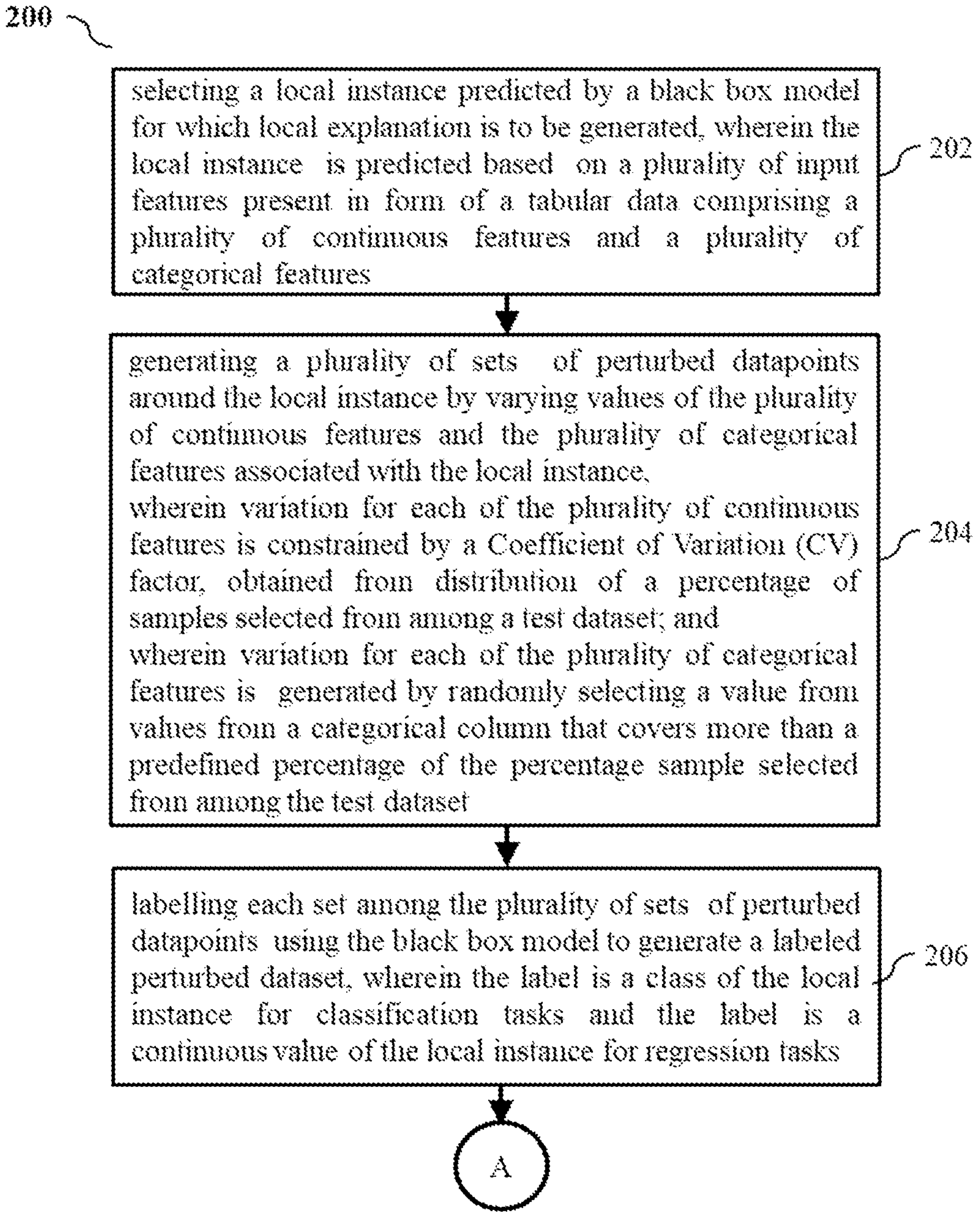
FIGS. 2A through 2B (collectively referred as FIG. 2) is a flow diagram illustrating a method for local explanation of the black box model based on the constrained perturbation and the ensemble-based surrogate model, using the system of FIG. 1A, in accordance with some embodiments of the present disclosure.
Figure 2B:
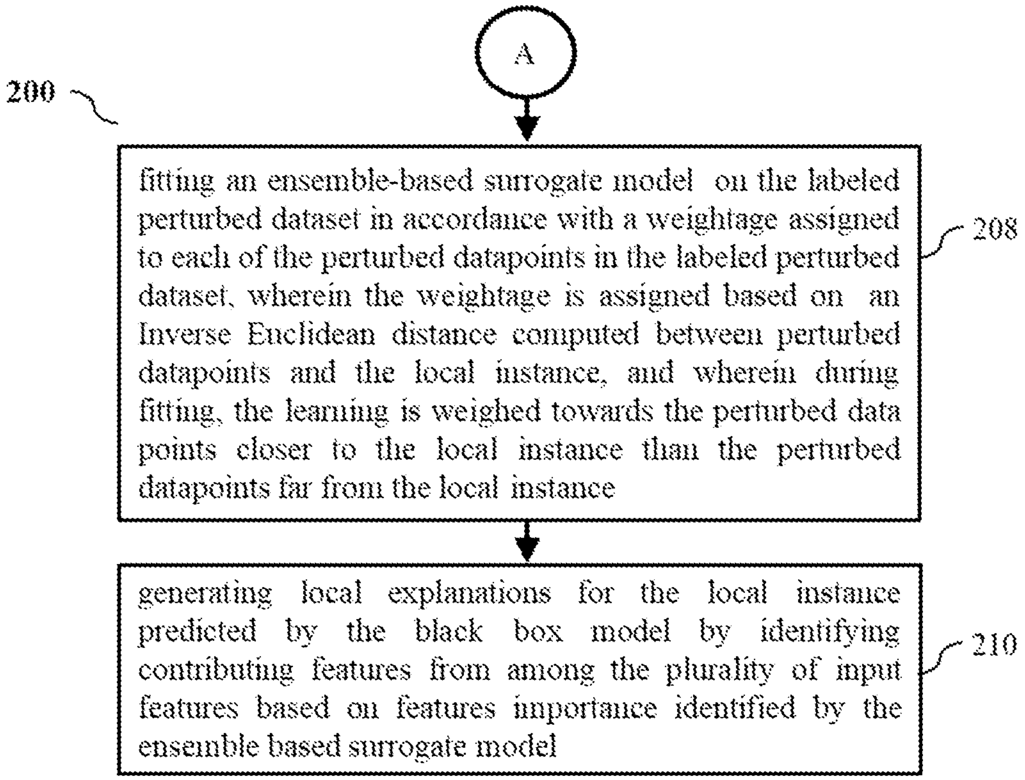
Figure 3:
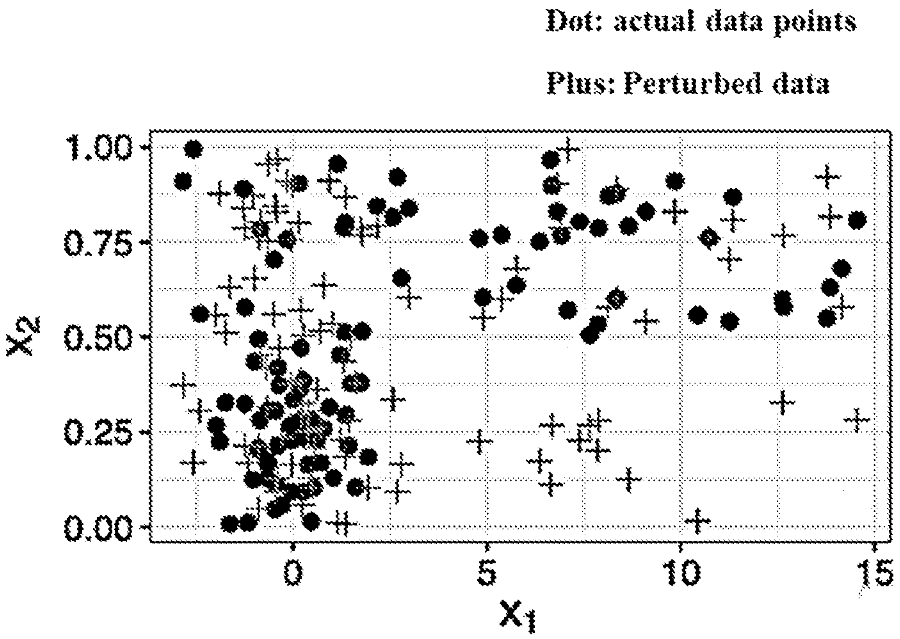
FIGS. 3 through 8C are graphical representations of output of the system of FIG. 1B when compared with state of the art techniques using multiple datasets, in accordance with some embodiments of the present disclosure.

FIGS. 2A through 2B (collectively referred as FIG. 2) is a flow diagram illustrating a method for local explanation of the black box model based on the constrained perturbation and the ensemble-based surrogate model, using the system of FIG. 1A, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A, 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 select a local instance predicted by the black box model (as depicted in FIG. 1B) for which local explanation is to be generated. The local instance is predicted based on a plurality of input features present in form of a tabular data comprising a plurality of continuous features and a plurality of categorical features.

At step 204 of the method 200, the one or more hardware processors 104 generate a plurality of sets of perturbed datapoints, via the perturbation module executed by the one or more hardware processor 104, around the local instance by varying values of the plurality of continuous features and the plurality of categorical features associated with the local instance. The generation of perturbed data is explained later with example.

a) The variation for each of the plurality of continuous features is constrained by a Coefficient of Variation (CV) score based factor, obtained from distribution of a percentage of samples selected from among a test dataset.

b) The variation for each of the plurality of categorical features is generated by randomly selecting a value from values from a categorical column that covers more than a predefined percentage (for example an higher percentage equal to 90%) of the percentage sample selected from among the test datasets.

At step 206 of the method 200, the black box model (pretrained base model) as in FIG. 1B, executed by the one or more hardware processors 104, labels each set among the plurality of sets of perturbed datapoints and generates a labeled perturbed dataset. As understood, the label is a class of the local instance for classification tasks and the label is a continuous value of the local instance for regression tasks.

At step 208 of the method 200, the one or more hardware processors 104 fit the ensemble-based surrogate model executed by the one or more hardware processors 104, on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance. During fitting, the learning is weighed towards the perturbed data points closer to the local instance than the perturbed datapoints far from the local instance.

At step 210 of the method 200, the one or more hardware processors 104 generate local explanations for the local instance predicted by the black box model by identifying contributing features from among the plurality of input features based on the feature importance from the ensemble based surrogate model, which is the local explanation of instance.

The step 202 through 210 performed by the system 100 are mathematically explained here. The test data X as has the input features are $f_1$, $f_2$, $f_3$ . . . fn. Length of the dataset set is 'm'. x1, x2, x3, . . . , xm are the instances (predictions by the black model box) of X. A random instance x (local instance) from the dataset X is selected. The base model (black box model) predicts a label on the local instance. In case of classification task, prediction is class of instance and in regression problem, it is a continuous value. The objective of the method 200 is to find the local explanation ($\xi_x$) of instance x, i.e., which are the features that effectively contributed to the prediction of a label. The method generates 'p' data points in the local proximity of the instance by perturbing the feature values of instance based on constrained condition. Perturb data is $p_1$, $p_2$, $p_3$, . . . , $p_p$ from the perturb data space ($\pi_x$). The base model (b) generates the label for the perturb data. The Euclidian distance of each perturb data with respect to instance ($x_i$) is calculated, which has to be explained. An inverse of this Euclidean distance called as weights is computed for the p perturbed datapoints: $w_1$, $w_2$, $w_3$, . . . , $w_p$. A tree-based model (ensemble based surrogate model) is fit on this perturb data p. The ensemble based surrogate model herein mentioned in the random forest, however any ensemble model like Gradient boosting tree and the like can be used. Say this model as surrogate model (s). Inputs of surrogate model are perturbed data, label, and weights (w). Now get the feature importance from the surrogate model which is local explanation of instance. Mathematical model for local explanation based in the method 200 is as follows:

$$\xi x = \mathcal{L}(b, x, \pi x, w) \quad (1)$$

TABLE 1

| | |
|---|---|
| $\xi_x$: Local explanation of instance x b: Base model (black box model) s: Surrogate model (ensemble based) | $\pi_x$: perturbed data space in local proximity of instance x based on constrained condition w: Weight for perturb data |

Constrained Perturbation: (a) Continuous Features:

Coefficient of variation (CV) is defined as below:

$$CV = \frac{\text{Standard deviation of sample}}{\text{mean of sample}} \quad (2)$$

CV measures the dispersion/distribution of sample data (from test dataset). Tabular dataset has multiple continuous feature columns. Each feature column has different CV i.e., dispersion. The CV score of continuous feature column is used by the method 200 to create perturbations. Creating perturbation based on the CV score make sure all perturbations are within the feature space of continuous value i.e., no outlier.

For continuous feature value the method 200 computes the CV/length/4 score of continuous column from sample data of test data. Where CV is coefficient of variation of features values corresponding to continuous column. Length is the length of sample data, 4 is an experimentally derived constant. The CV score is for sample data of the test dataset. CV/length takes an approximation of how much each data in sample data contributes to CV score Further the CV/length is divided by constant 4. The CV score is used to create the perturbation of continuous feature value of target instance or local instance. The constant value '4' is derived experimentally as below. To decide the number 4 following experiments were performed The objective is to create perturbed datapoints that are closer to the instance. So, perturbation of continuous features values are created using CV/length, CV/length/2 and CV/length/4 and these perturbations and test dataset was visualized using principal component analysis (PCA). From visualization it was noticed that CV/length/4 gives more closer perturbations. These experiments were conducted on three datasets that are Bank Loan, Titanic data set and Boston house price dataset. CV/length/4 creates closer perturbation in all three datasets, which concluded to narrow down on '4' as the value of the constant. Following example helps to understand the CV score based approach for perturbation. In an bank loan application, a loan applicant has total income of 5,000. The perturbation module takes a sample data from test dataset. Let sample data have 10 rows i.e., it has length of 10.

Feature selected income=5000

Sample length=10

Mean of the 10 samples of total income=5010

Standard deviation of =800

$$CV/\text{length}/4 = 800/5010/10/4 = 0.00399 \text{ or } 0.4\%$$

Generate a random value in the range of [5000, (1+0.004) *5000]

(b) Categorical features: For perturbing the categorical feature of a target instance, the perturbation module selects a random value from the unique value of features column that covers greater than and equal to 90% (predefined percentage) of features values in sample data. For the above bank loan example, a sample data from the test dataset is selected. Let sample data has 10 rows. Feature column 'Dependents' is a categorical column with entries of 0, 1, 2 and 3.

Feature selected Dependents=2

Frequency of dependent feature values in 10 rows.

TABLE 2

| Feature value | Frequency |
|---|---|
| 0 | 4 |
| 1 | 3 |

TABLE 2-continued

| Feature value | Frequency |
|---|---|
| 2 | 2 |
| 3 | 1 |

Get the cumulative sum of frequency and divide it with length of sample data.

TABLE 3

| Feature value | Frequency | Cusum/length |
|---|---|---|
| 0 | 4 | 4/10 = 0.4 |
| 1 | 3 | (4 + 3)/10 = 0.7 |
| 2 | 2 | (4 + 3 + 2)/10 = 0.9 |
| 3 | 1 | (4 + 3 + 2 + 1)/10 = 1.0 |

Cumulative sum/length at feature value '2' has score greater than and equal to 0.9 which mean feature values 0, 1, 2 appears more than and equal to 90% times in sample data for dependent column. Feature values '3' appears only one time in the sample data. It does not represent the population. Hence generate a random value from the feature values 0, 1 and 2.

From the above examples it can be understood that the system 100, automatically determines the constraints by self-identifying the bounds within which data is to be perturbed, where the understanding of the distribution or dispersion of test data sample enables the system 100 to be within the feature space of the input features associated with the local instances or target instances of the black box model.

Experimental Results and Discussions

Correlation problem and solution: Post-hoc explainability models are mostly model agnostic like LIME, SHAP. These models create new data point in the feature space to generate interpretation of the model. According to Christoph Molnar "Interpretation models assumes features of data do not correlate to each other." In real case there might be condition where features are correlated with each other. In this scenario, explainability model can generate datapoint that does not represent the population. As explained by Christoph in Molnar diagram of FIG. 3, 'X1' and 'X2' are two features. Data points represented by 'dots' are the actual datapoints. Permutation of feature 'X1' makes new data points represented by 'plus'. There are some new data points (plus) in bottom right corner. As can be understood, these data points do not represent the actual data. Thus, if any explainability model makes decision based on these points, it affects the quality of interpretability result.

Figure 4:
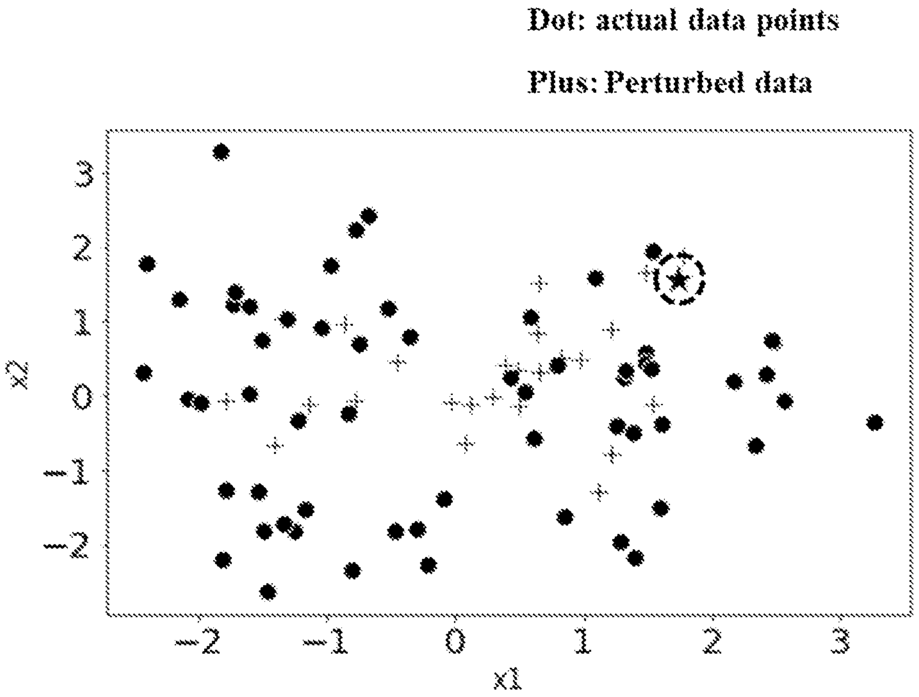

FIG. 4 shows perturbed data points (plus symbols) generated by the method 200 for a Bank loan data that has 12 features. A principal component analysis (PCA) was applied on this data with two number of components. A 'star' represents the local instance from the base data. The data points associated with 'plus' are perturbed data points generated by the method 200. All 'plus' data points are in feature space of base data. Thus, method 200 provides a confidence of averting the correlation problem. Since the features of the perturbed data fall within the base data feature space, the fooling of explanations of the adversarial classifier can be averted.

Figure 5A:
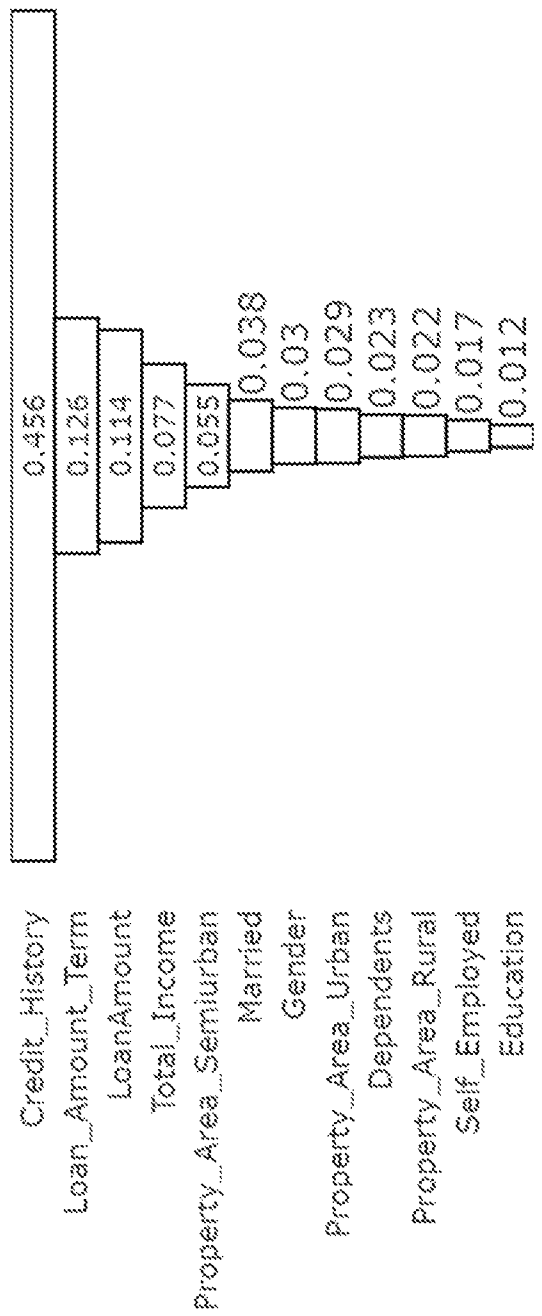
Figure 5B:
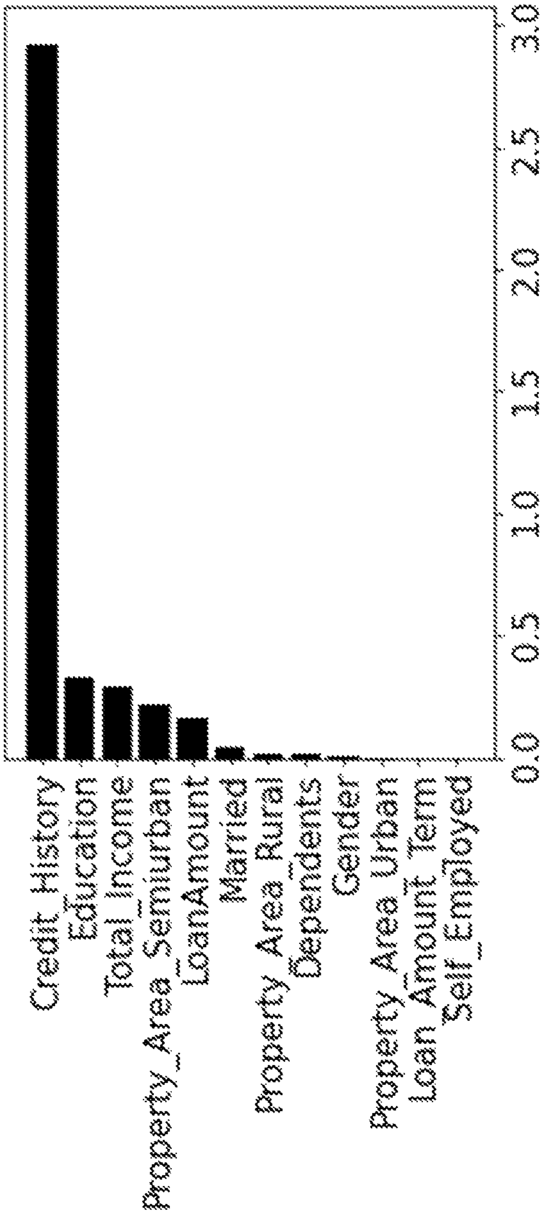

FIGS. 5A-5B, 6A-6B and 7A-7B depict explanations generated by method 200 been validated against SHAP explanations on the Bank loan dataset (classification problem), the Titanic dataset (classification problem), and the Boston dataset (regression problem), respectively Bank Loan dataset (classification type of task—loan approved—denied): Features selected for this experiment include Loan Amount Term, Total Income, Loan Amount as continuous variable. Other than these, there are present are categorical variables. In the Bank Loan use case herein, 50 perturb data points are created from an instance and weight of each perturbed data point is computed. The method 200 disclosed herein is used to generate an explanation of the instance. FIG. 5A shows the explanation for the instance. The ensemble based surrogate model gives feature importance to Top 5 features that include Credit history, Total income, Loan amount term, Property area semiurban and Loan amount which cause the loan denial for this instance.

To validate the result of the method 200, a SHAP explainer model is trained. Inputs to this SHAP model are the instance and base model. When FIG. 5A is compared to SHAP explanations of FIG. 5B, it is observed that four features from top-5 features of the method 200 are available in the top-5 features of SHAP explainer.

Titanic dataset (classification type task-passenger survived or not): This dataset has passenger details of titanic ship like passenger class, sex, age, fare, and passenger survived or not etc. It is a binary classification problem. The processed dataset has six feature columns and one label. Out of six features, Age and fare are continuous variables and the remaining are categorical variables. A instance is selected randomly for which the black box model predicted not survived. The method 200 generated 50 perturb data from an instance.

Figure 6A:
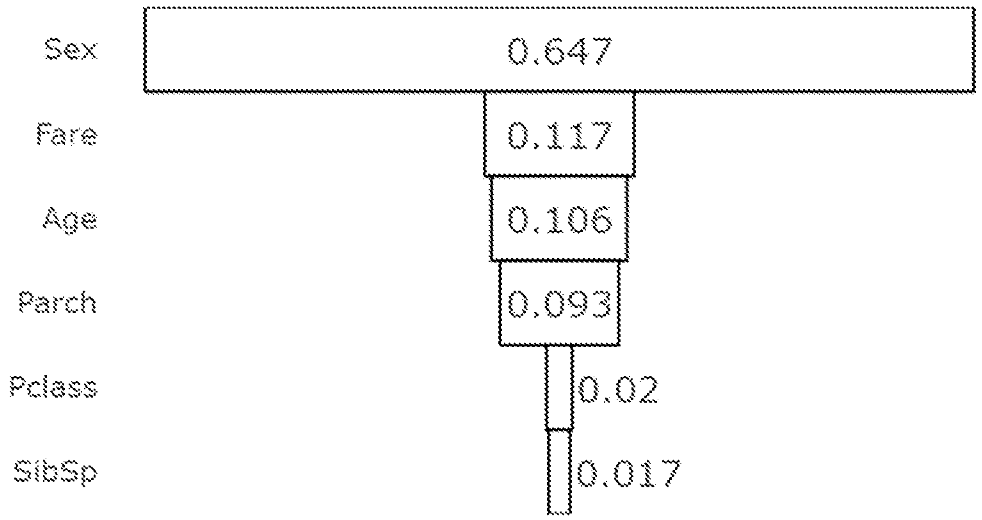
Figure 6B:
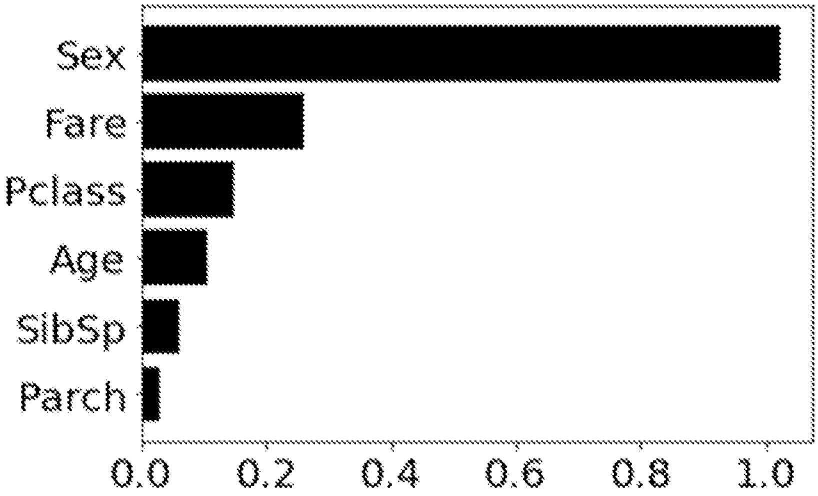

To validate the result of the method 200, the SHAP explainer model is trained. Inputs to this SHAP model are the instance and base model. When FIG. 6A is compared to SHAP explanations of FIG. 6B, it is observed that two features from top-3 features of the method 200 are available in the top-3 features of SHAP explainer.

Figure 7A:
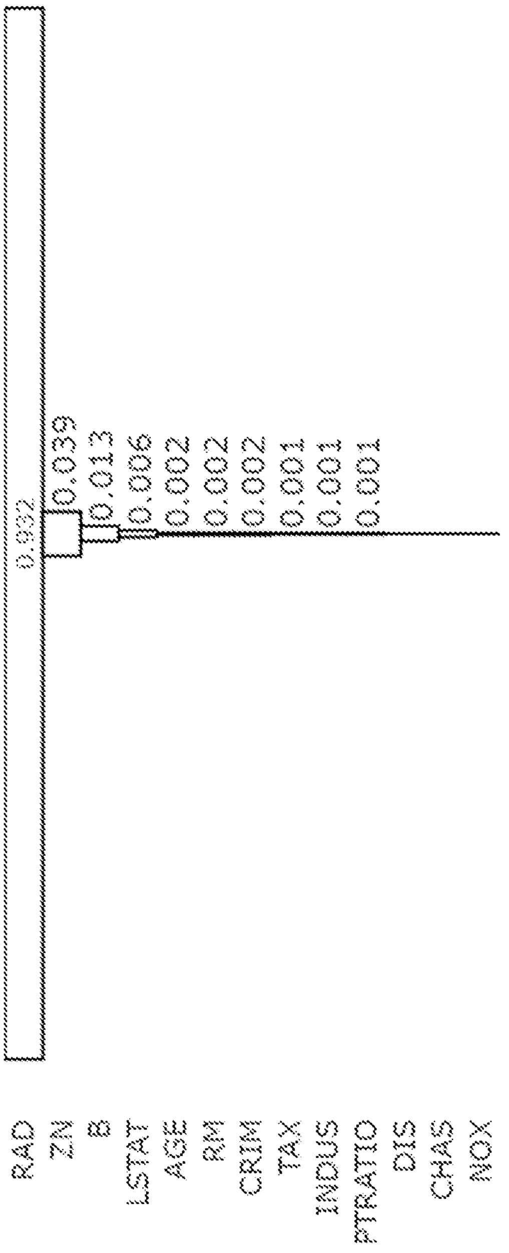
Figure 7B:
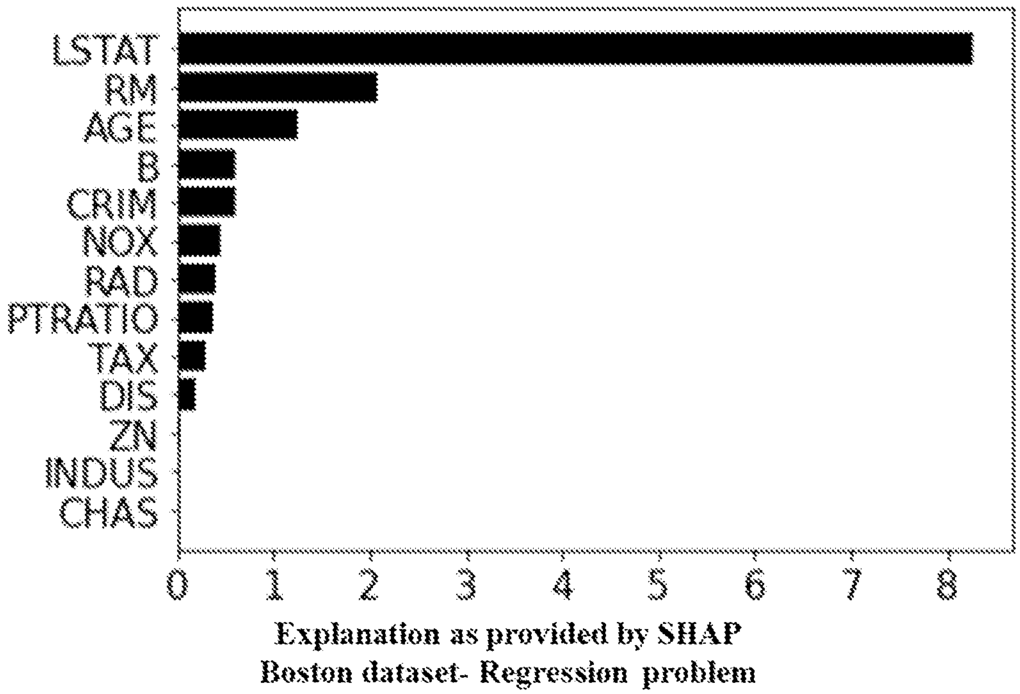
Figure 8A:
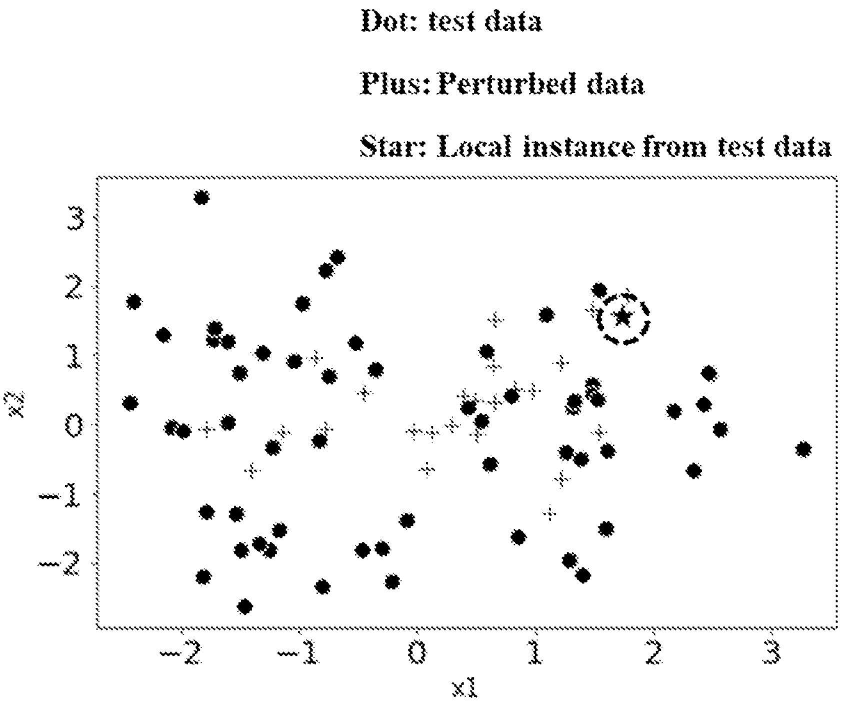
Figure 8B:
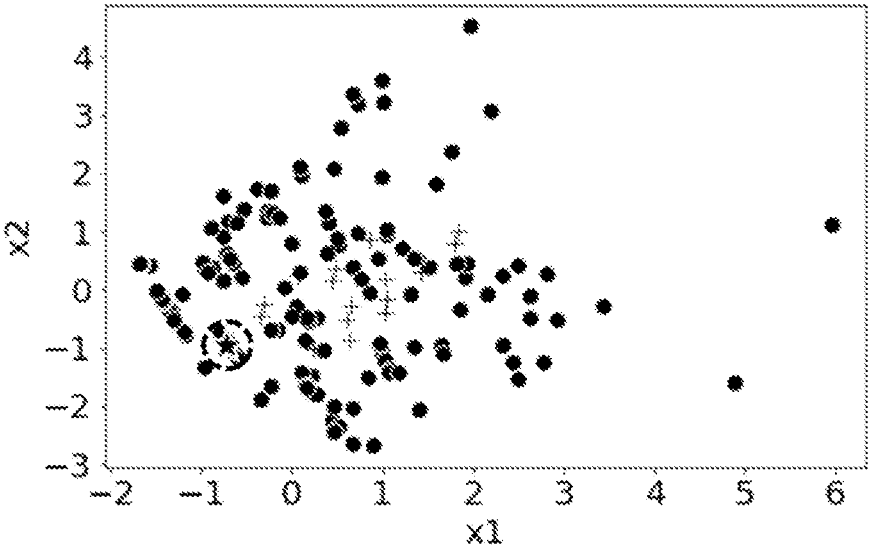
Figure 8C:
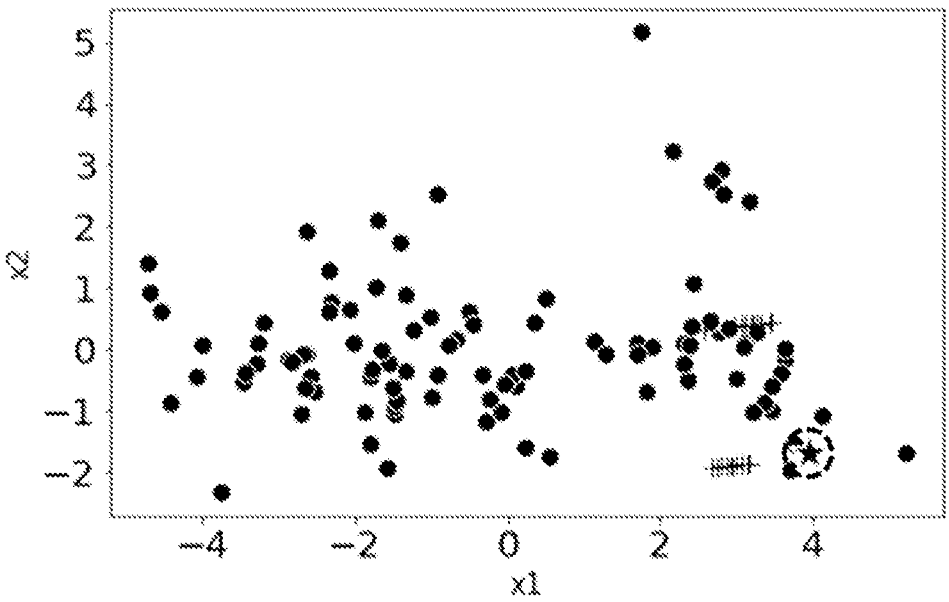

Boston house data set (regression problem predicting house price): The Boston dataset has 13 features of house like age of house, rooms in room, location of house etc. Based on these features of house, it has a price. ZN (proportion of residential land zoned for lots over 25,000 sq. ft), CHAS (Charles river dummy variable (=1 it tract bounds river, 0 otherwise) and RAD (Index of accessibility to radial highways) are categorical features of data set remaining are continuous variable. 50 perturbed data were generated by the method 200. FIG. 7A shows that four features from the method 200 and SHAP (top-6 features) explainer (FIG. 7B) are same FIGS. 8A, 8B and 8C depict perturbed data (plus) points are nearby the local instance (star) and within the feature space of the Bank loan dataset, the Titanic dataset, and the Boston dataset respectively The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for explainability of black box models, the method comprising:

selecting, via one or more hardware processors, a local instance predicted by a black box model for which local explanation is to be generated, wherein the local instance is predicted based on a plurality of input features present in form of a tabular data comprising a plurality of continuous features and a plurality of categorical features;

generating, via the one or more hardware processors, a plurality of sets of perturbed datapoints around the local instance by varying values of the plurality of continuous features and the plurality of categorical features associated with the local instance, wherein varying of the values for each of the plurality of continuous features is constrained by a Coefficient of Variation (CV) score, obtained from distribution of a percentage of sample data selected from among a test dataset, and wherein varying of the values for each of the plurality of categorical features is generated by randomly selecting a value from the values from a categorical column that covers more than a predefined percentage of the percentage of the sample data selected from among the test dataset;

labelling, via the one or more hardware processors, each set among the plurality of sets of perturbed datapoints using the black box model to generate a labeled perturbed dataset, wherein the label is a class of the local instance for classification tasks and the label is a continuous value of the local instance for regression tasks;

fitting, via the one or more hardware processors, an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance; and generating, via the one or more hardware processors, local explanations for the local instance predicted by the black box model by identifying contributing features from among the plurality of input features based on feature importance identified by the ensemble based surrogate model.

2. The processor implemented method of claim 1, wherein the CV score is obtained using the equation (CV/length)*¼, wherein the CV is coefficient of variation of features values corresponding to a column of a continuous feature, length is the length of the sample data, 4 is an experimentally derived constant.

3. A system for explanation of black box model, the system comprising:

a memory storing instructions;

one or more Input/Output (I/O) interfaces; and one or more hardware processors coupled to the memory via the one or more I/O interfaces, wherein the one or more hardware processors are configured by the instructions to:

select a local instance predicted by a black box model for which local explanation is to be generated, wherein the local instance is predicted based on a plurality of input features present in form of a tabular data comprising a plurality of continuous features and a plurality of categorical features;

generate a plurality of sets of perturbed datapoints around the local instance by varying values of the plurality of continuous features and the plurality of categorical features associated with the local instance, wherein varying of the values for each of the plurality of continuous features is constrained by a Coefficient of Variation (CV) score, obtained from distribution of a percentage of sample data selected from among a test dataset, and wherein varying of the values each of the plurality of categorical features is generated by randomly selecting a value from the values from a categorical column that covers more than a predefined percentage of the percentage of the sample data selected from among the test dataset;

label each set among the plurality of sets of perturbed datapoints using the black box model to generate a labeled perturbed dataset, wherein the label is a class of the local instance for classification tasks and the label is a continuous value of the local instance for regression tasks;

fit an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance; and generate local explanations for the local instance predicted by the black box model by identifying contributing features from among the plurality of input features based on feature importance identified by the ensemble based surrogate model.

4. The system of claim 3, wherein the CV score is obtained using the equation (CV/length)*¼, wherein the CV is coefficient of variation of features values corresponding to a column of a continuous feature, length is the length of the sample data, 4 is an experimentally derived constant.

5. One or more non-transitory machine-readable information storage mediums comprising one or more instructions which when executed by one or more hardware processors cause:

selecting a local instance predicted by a black box model for which local explanation is to be generated, wherein the local instance is predicted based on a plurality of input features present in form of a tabular data comprising a plurality of continuous features and a plurality of categorical features;

generating a plurality of sets of perturbed datapoints around the local instance by varying values of the plurality of continuous features and the plurality of categorical features associated with the local instance, wherein varying of the values for each of the plurality of continuous features is constrained by a Coefficient of Variation (CV) score, obtained from distribution of a percentage of sample data selected from among a test dataset, and wherein varying of the values for each of the plurality of categorical features is generated by randomly selecting a value from the values from a categorical column that covers more than a predefined percentage of the percentage of the sample data selected from among the test dataset;

labelling each set among the plurality of sets of perturbed datapoints using the black box model to generate a labeled perturbed dataset, wherein the label is a class of the local instance for classification tasks and the label is a continuous value of the local instance for regression tasks;

fitting an ensemble-based surrogate model on the labeled perturbed dataset in accordance with a weightage assigned to each of the perturbed datapoints in the labeled perturbed dataset, wherein the weightage is assigned based on an Inverse Euclidean distance computed between perturbed datapoints and the local instance, and wherein during fitting, the learning is weighed towards the perturbed data points closer to the local instance than the perturbed datapoints far from the local instance; and generating local explanations for the local instance predicted by the black box model by identifying contributing features from among the plurality of input features based on feature importance identified by the ensemble based surrogate model.

6. The one or more non-transitory machine readable information storage mediums of claim 5, wherein the CV score is obtained using the equation (CV/length)*¼, wherein the CV is coefficient of variation of features values corresponding to a column of a continuous feature, length is the length of the sample data, 4 is an experimentally derived constant.

* * * * *